(12) United States Patent
Tsuruoka et al.

(10) Patent No.: US 9,884,613 B2
(45) Date of Patent: Feb. 6, 2018

(54) BRAKE SYSTEM

(71) Applicant: HITACHI AUTOMOTIVE SYSTEMS, LTD., Hitachinaka-shi, Ibaraki (JP)

(72) Inventors: Katsuma Tsuruoka, Atsugi (JP); Yukinori Otsuka, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/915,815

(22) PCT Filed: May 22, 2014

(86) PCT No.: PCT/JP2014/063535
§ 371 (c)(1),
(2) Date: Mar. 1, 2016

(87) PCT Pub. No.: WO2015/040889
PCT Pub. Date: Mar. 26, 2015

(65) Prior Publication Data
US 2016/0214587 A1    Jul. 28, 2016

(30) Foreign Application Priority Data

Sep. 20, 2013  (JP) ................................. 2013-195410

(51) Int. Cl.
*B60T 8/48* (2006.01)
*B60T 8/34* (2006.01)
*B60T 8/36* (2006.01)

(52) U.S. Cl.
CPC .............. *B60T 8/341* (2013.01); *B60T 8/368* (2013.01); *B60T 8/4872* (2013.01)

(58) Field of Classification Search
CPC ......... B60T 8/341; B60T 8/4872; B60T 8/368
See application file for complete search history.

(56) References Cited

U.S. PATENT DOCUMENTS 6,022,085 A     2/2000  Ganzel et al.
2009/0152941 A1* 6/2009  Isono .................... B60T 13/686
                                                303/114.1
(Continued)

FOREIGN PATENT DOCUMENTS

JP      08-230642 A     9/1996
JP      10-157598 A     6/1998
(Continued)

*Primary Examiner* — Bradley T King
(74) *Attorney, Agent, or Firm* — Foley & Lardner LLP

(57) ABSTRACT

[Summary] To provide a brake system in which due to change in structure of a seat member, an end portion of a push rod that faces a piston can be increased in diameter and thus weight reduction of entire construction of the piston and suppression of vibration hitting noises are obtained.

A seat member 27 of a check valve mechanism 25 is formed at a position opposite to one open end of a connecting hole 27a with a recessed portion 27d that is opened to a liquid pressure chamber 20b, a retainer 31 that has at its center part a sliding hole 31c for slidably supporting the push rod 32 is fixed to an open side of the recessed portion, an annular part of the retainer is formed with an arcuate and elongate passage hole 31e for communicating the recessed portion with the liquid pressure chamber, a smaller diameter rod part 32a of the push rod, which is arranged at the side of the ball valve body 29, is inserted from the sliding hole toward a ball valve body through the recessed portion and the connecting hole, and a larger diameter rod part 32b of the push rod, which is kept inserted toward the ball valve body is slidably supported by the sliding hole.

14 Claims, 14 Drawing Sheets

(56) References Cited

U.S. PATENT DOCUMENTS

| | | | |
|---|---|---|---|
| 2010/0052417 A1* | 3/2010 | Aoba | B60T 8/368 |
| | | | 303/115.4 |
| 2012/0139331 A1* | 6/2012 | Terashima | B60T 8/368 |
| | | | 303/10 |
| 2013/0213498 A1 | 8/2013 | Iyatani et al. | |
| 2014/0116244 A1* | 5/2014 | Murayama | B60T 8/368 |
| | | | 91/418 |
| 2014/0361204 A1* | 12/2014 | Kratzer | B60T 8/341 |
| | | | 251/63.6 |
| 2015/0166026 A1* | 6/2015 | Koyama | B60T 13/146 |
| | | | 303/115.4 |
| 2015/0353065 A1* | 12/2015 | Iyatani | B60T 8/368 |
| | | | 303/10 |

FOREIGN PATENT DOCUMENTS

| | | |
|---|---|---|
| JP | 2012-131436 A | 7/2012 |
| JP | 2013-006521 A | 1/2013 |
| JP | 2013-169923 A | 9/2013 |

\* cited by examiner

BRAKE SYSTEM

TECHNICAL FIELD

The present invention relates to a brake system that controls a braking force applied to road wheels of a vehicle by a brake liquid.

BACKGROUND ART

One conventional brake system is shown in the following Patent Document-1. The outline of the system will be described. The brake system generally comprises a housing that has therein oil passages through which a brake liquid pressurized by a master cylinder flows, an electric pump that sucks the brake liquid from a reservoir tank provided in the housing, pressure increasing/decreasing electromagnetic valves that are connected to the housing for controlling the brake liquid led to each of wheel cylinders of the road wheels and a control mechanism that controls the pressure increasing/decreasing electromagnetic valves and the above-mentioned electric pump.

The reservoir tank is provided with a cylinder that is formed in the housing and has one end that is connected, as well as to the master cylinder, to one end of a brake liquid passage connected to the corresponding wheel cylinder through the pressure decreasing electromagnetic valve, a synthetic resin piston that is slidably received in the cylinder and biased by a coil spring in a direction to reduce the volume of the cylinder, and a check valve mechanism that is provided at an upper part of the cylinder to control the brake liquid existing between the master cylinder and a liquid pressure chamber of the cylinder.

The check valve mechanism is equipped with a seat member that is formed with a connecting opening through which a brake liquid pressure passage connected to the master cylinder and the cylinder are connected, a ball valve element that is selectively seated on and separated from a valve seat of the seat member to close and opening one side of the connecting opening of the seat member, a valve spring that biases the ball valve element toward the valve seat, and a metal push rod that is lifted up by the piston when the piston is slid upward by a predetermined degree or more by the spring force of the coil spring, so that the ball valve element is separated from the valve seat against the spring force of the valve spring thereby to open one side of the connecting opening.

When, due to operation of the electric pump, the brake liquid in the cylinder is discharged, the piston is moved upward in the cylinder by the spring force of the coil spring thereby pushing up the push rod to separate the ball valve element from the valve seat bringing about an open condition, so that the brake liquid pressure of the master cylinder is led into the cylinder from the brake liquid pressure passage through the connecting opening. While, when the brake liquid pressure is led into the cylinder from the wheel cylinder through the pressure decreasing electromagnetic valve, the piston is moved downward against the spring force of the coil spring suppressing the push rod from pushing up the ball valve element, so that the ball valve element is seated on the valve seat due to the spring force of the valve spring thereby to close the open end of the connecting opening.

However, in the above-mentioned conventional brake system, due to the inherent construction of the check valve mechanism, the inner diameter of the connecting opening of the seat member is larger at a side facing the ball valve element and smaller at a side facing the piston, and thus, at the time when the above-mentioned parts are being assembled, the push rod has to be inserted into connecting opening from the top of the opening, that is, from the upper side where the ball valve element is placed toward (or toward the cylinder) the lower side where the piston is placed. Accordingly, one end of the push rod that is directed toward the ball valve element has a larger diameter and the other end of the push rod that is directed toward the piston has a smaller diameter.

PRIOR ART DOCUMENTS

Patent Documents

Patent Document-1: Japanese Laid-open Patent Application (tokkai) 2012-131436

SUMMARY OF INVENTION

Problems to be Solved by Invention

However, since the surface pressure produced when the smaller diameter lower end of the metal push rod and the upper surface of the synthetic resin piston are brought into contact with each other is pretty high, a long-time usage of the brake system tends to cause production of a recess on the upper surface of the piston.

The present invention is provided by taking the above-mentioned undesirable facts of the conventional brake system into consideration and aimed to provide a brake system that is able to suppress increase of the surface pressure between a push rod and a piston by increasing the diameter of the push rod at the end facing the piston due to structural change of a seat member.

Means for Solving the Problems

In the invention defined by claim 1, a push rod has one end portion contactable with a valve body and the other end portion contactable with an upper surface of a piston, an area of the other end portion is equal to or larger than an area of the one end portion, a seat member of a check valve mechanism is formed, at a position opposite to the one open end, with a recessed portion that is opened to a liquid pressure chamber, a retainer that has at a central portion thereof a sliding hole for slidably supporting the other end portion of the push rod is fixed to an open end of the recessed portion, and at least one of the push rod and the retainer is formed with a passage portion by which the recessed portion and the liquid pressure chamber are communicated.

Effects of Invention

According to the invention, the end of the push rod that is directed toward the piston can be increased in diameter, and thus, the surface pressure between the end of the push rod and the upper surface of the piston can be reduced.

EMBODIMENTS FOR CARRYING OUT INVENTION

In the following, embodiments of the brake system of the present invention will be described with reference to accompanying drawings. These embodiments are those that are applied to commonly used control devices such as brake controller and anti-lock brake controller (ABS) of a motor vehicle.

First Embodiment

Figure 1:
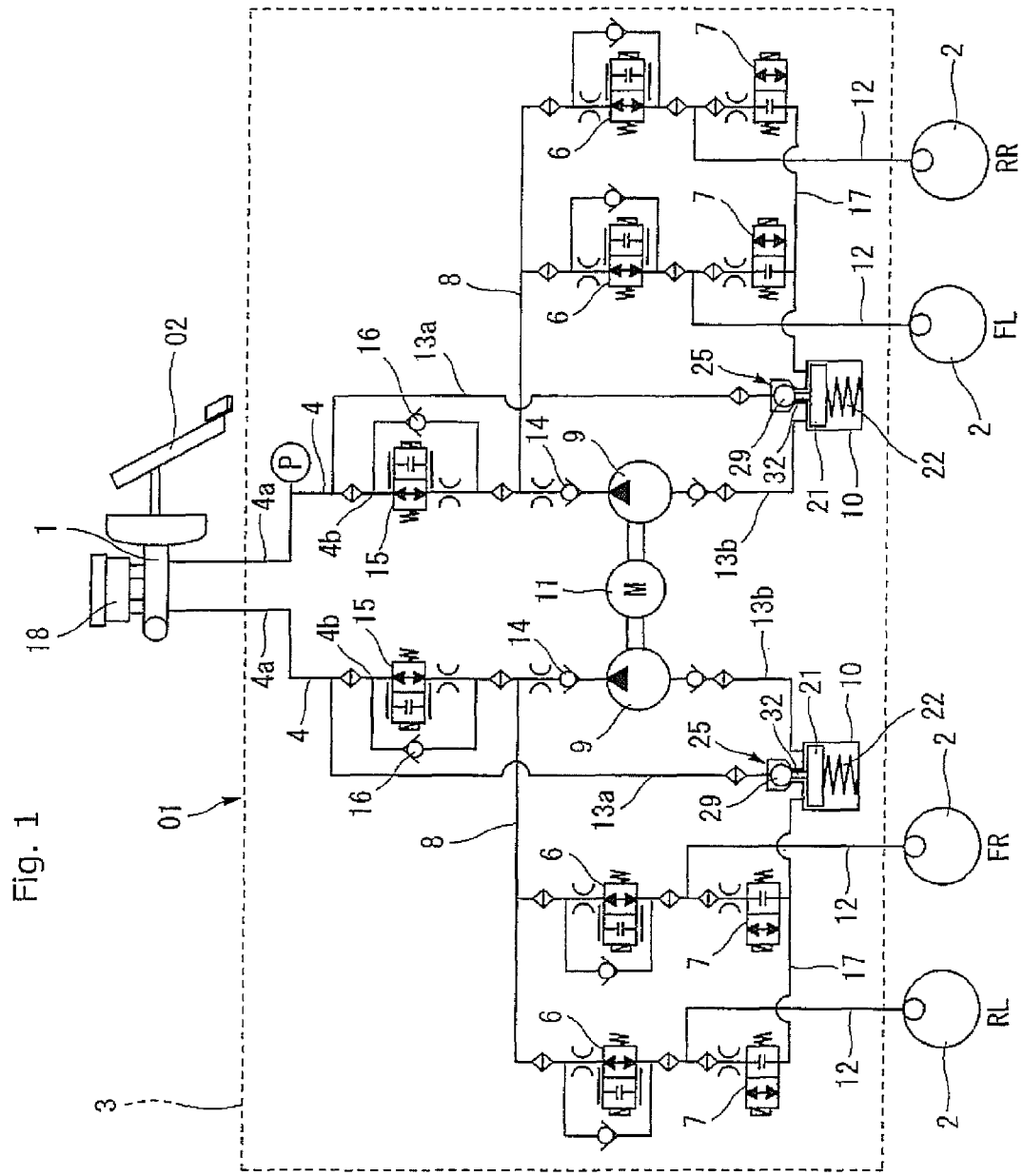
FIG. 1 is a liquid pressure circuit diagram applied to an embodiment of a brake system of the present invention.

As is seen from the liquid pressure circuit diagram of FIG. 1, the brake system is provided in a liquid pressure control unit 01 that is arranged between a master cylinder 1 that produces a brake pressure whose value depends on a depression degree of a brake pedal 02 and each of wheel cylinders 2. Designated by numeral 18 is a master reservoir that reserves a residual part of the brake liquid of the master cylinder 1. The liquid pressure control unit 01 has a generally rectangular parallelepiped housing 3 made of an aluminum alloy block and comprises a pair of main passages 4 and 4 that are formed in the housing 3 for connecting the master cylinder 1 to wheel cylinders 2 of front right and left road wheels (FR, FL) as well as to wheel cylinders 2 of rear right and left road wheels (RR, RL), normally open solenoid type pressure boosting valves 6 and 6 and normally closed type pressure releasing valves 7 and 7 that are respectively installed in the main passages 4 and 4 to control the brake liquid pressure fed from the master cylinder 1 to the wheel cylinders 2, two reservoir tanks 10 and 10 that receive or reserve, through the pressure releasing valves 7 and 7, the brake liquid discharged from the wheel cylinders 2, a pair of plunger pumps 9 and 9 that are installed in sub-passages 8 and 8 branched from the main passages 4 and 4 for feeding the wheel cylinders 2 (W/C) with the brake liquid pressure and feeding the master cylinder 1 with the brake liquid reserved in the reservoir tanks 10 and 10, and a pump motors 11 that drives the plunger pumps 9 and 9.

Each of the pressure boosting valves 6 and the corresponding wheel cylinder 2 are connected through a cylinder wheel port 12 that is formed on an upper surface of the housing 3.

The master cylinder 1 and the liquid pressure control unit 01 are connected to the main passages 4 and 4 through master cylinder ports 4a and 4a that are formed on the port connecting surface of the housing 3. Furthermore, the master cylinder 1 and the reservoir tanks 10 are connected through branch passages 13a and 13a that are oil passages branched from the main passages 4 and 4, and the reservoir tanks 10 and inlet sides of the plunger pumps 9 are connected through liquid pressure passages 13b and 13b that are oil passages. The reservoir tanks 10 and the pressure releasing valves 7 are connected through liquid pressure passages 17 and 17 that are oil passages.

Outlet sides of the plunger pumps 9 and the corresponding wheel cylinders 2 are connected through the sub-passages 8, and the sub-passages 8 have respectively the pressure boosting valves 6 connected thereto, each pressure boosting valve 6 being connected to the corresponding wheel cylinder 2. Each of the plunger pumps 9 is provided with a check valve 14 that permits only the flow of the brake liquid directed toward the pressure boosting valve 6 from the outlet port.

Each main passage 4 has, at an upstream side of the corresponding pressure boosting valve 6, a gate-out valve 15. The gate-out valve 15 is an electromagnetic open/close valve of normally open solenoid type that is opened when normal brake operation and/or ABS operation takes place and closed when a behavior controlling takes place.

Each gate-out valve 15 has a liquid pressure passage 4b that is equipped with a check valve 16 that blocks a flow of the brake liquid from the corresponding plunger pump 9. That is, the check valves 16 permit only a flow of the brake liquid pressure directed toward the wheel cylinders 2 and block an opposite flow.

Upon normal braking operation, each pressure boosting valve 6 is controlled to feed the brake liquid pressure to the corresponding wheel cylinder 2 from the master cylinder 1. While, when, due to occurrence of road wheel slip, the behavior of the vehicle is disturbed, each pressure releasing valve 7 is opened to return the brake liquid to the reservoir tank 10 from the wheel cylinder 2 causing the reservoir tank to temporally reserve the brake liquid. These pressure boosting and pressure releasing valves 6 and 7 are controlled to effect Open/Close operation upon receiving control current from a non-illustrated control unit, and with such operations, the brake liquid pressure in each wheel cylinder 2 is controlled to be increased, decreased or held.

Upon operation of the plunger pumps 9 by the pump motor 11, the brake liquid temporally reserved in the reservoir tanks 10 is returned to the master cylinder 1 from the liquid pressure passages 13b through the gate-out valves 15.

Under this behavior control to the vehicle, the plunger pumps 9 are driven by the pump motor 11 and due to operation of the control unit, the gate-out valves 15 are closed and the pressure boosting valves 6 for the wheel cylinders 2 that are to be applied with the liquid pressure are opened. Accordingly, the brake liquid pressure discharged from the plunger pumps 9 is forcibly led to predetermined wheel cylinders 2 through the sub-passages 8 and the pressure boosting valves 6, so that the internal pressure of each wheel cylinder 2 is controlled.

Figure 2:
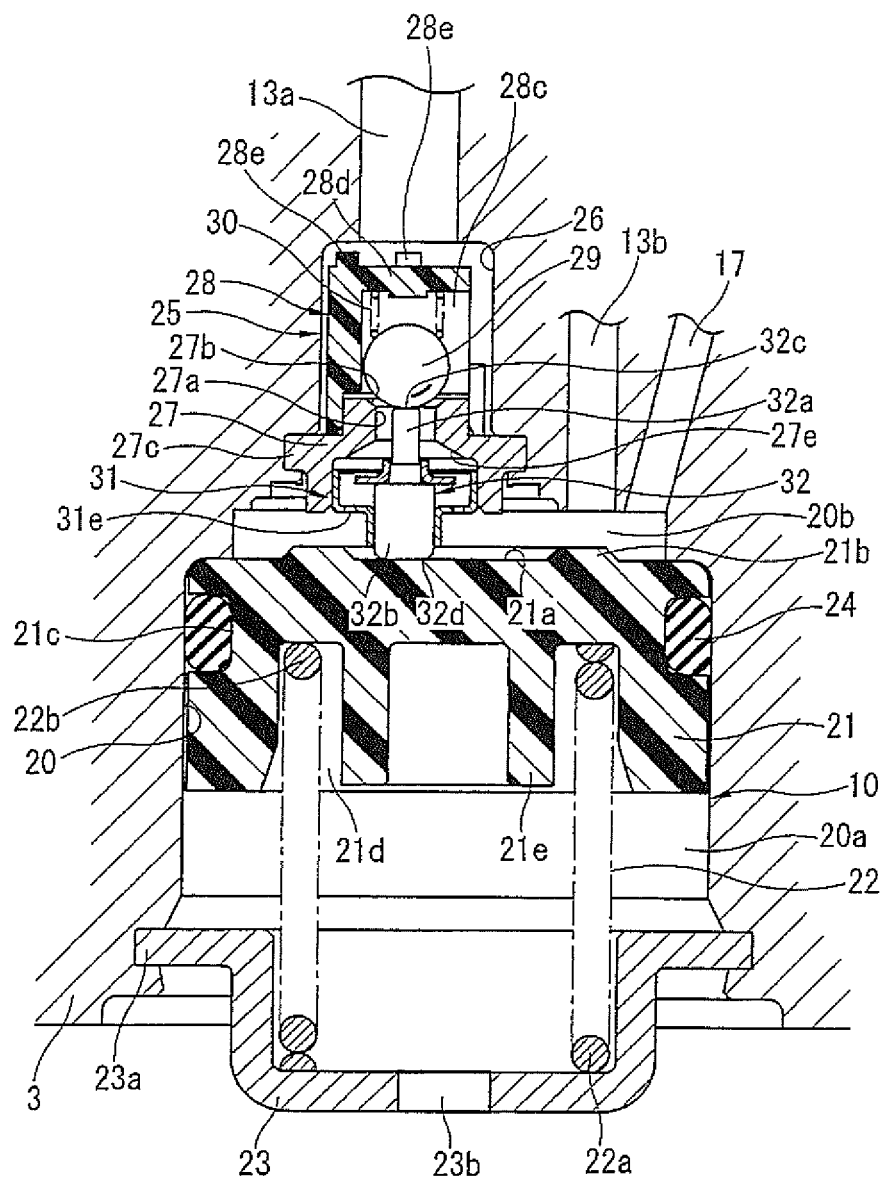
FIG. 2 is a vertically sectioned view of a reservoir tank and a check valve mechanism in an open condition which are used in the embodiment.
Figure 3:
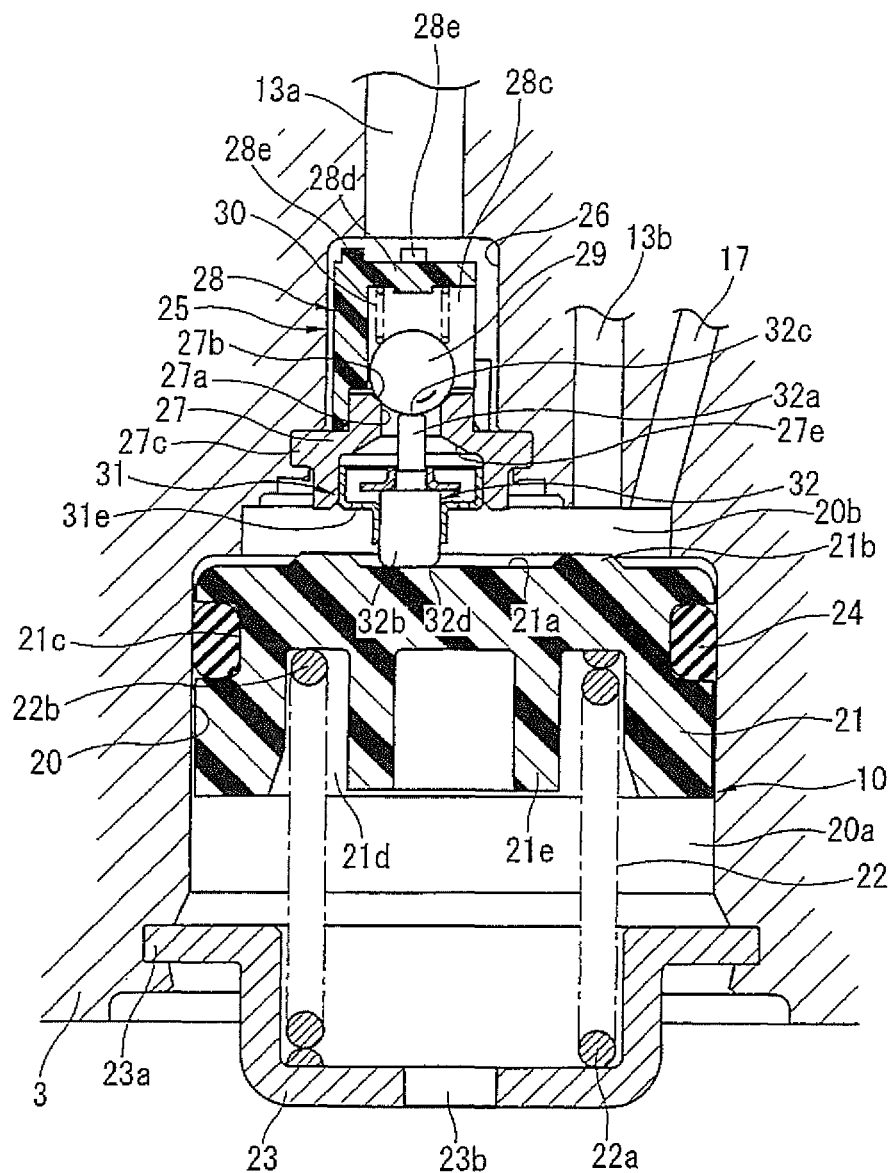
FIG. 3 is a vertically sectioned view of the reservoir tank and the check valve mechanism in a closed condition which are used in the embodiment.

As is seen from FIGS. 2 and 3, each reservoir tank 10 is equipped with a bottomed cylindrical cylinder 20 that is formed in a lower end portion of the housing 3, a piston 21 that is vertically slidably received in the cylinder 20 while forming in the cylinder 20 both an air chamber 20a and a liquid pressure chamber 20b that temporally reserves therein the brake liquid, and a coil spring 22 that is a first biasing member compressed and set in the air chamber 20a for biasing the piston 21 in a direction to reduce the volume of the liquid pressure chamber 20b, that is, in an upward direction in the drawings.

The cylinder 20 has both a lower end with a bottom opening that is closed by a lid member 23 and an upper end to which one end of the branch passage 13a is connected, the branch passage 13a having the other end connected to the master cylinder 1. In addition to this, to the upper end of the cylinder 20, there is connected one end of the liquid pressure passage 13b whose other end is connected to the plunger pump 9. Furthermore, to a side of the liquid pressure passage 13b, there is connected one end of the liquid pressure passage 17 whose other end is connected to the pressure releasing valve 7.

The lid member 23 is made of metal and shaped like a cup in a sectional view, and for fixing the lid member, a flange portion 23a provided around a peripheral part of the cup-shaped lid member is tightly caulked by a lower groove of the cylinder 20. To the bottom of the lid member, there is pressed a lower end portion 22a of the coil spring 22, so that the lid member serves as a spring retainer. At a central portion of the lid member, there is formed an air bleed opening 23b that is connected to the air chamber 20a to obtain a smoothed sliding of the piston 21.

The piston 21 is integrally made of synthetic resin and has at a peripheral part of an upper surface 21a thereof, which faces the liquid pressure chamber 20b, an annular projection 21b integrally connected thereto. The piston 21 has at an upper peripheral portion thereof a fixing groove 21c in which an oil seal 24 is tightly received, the oil seal 24 being able to seal the liquid pressure chamber 20b by sliding on and along an inner cylindrical wall of the cylinder 20. Furthermore, the piston 21 has at a lower part thereof an annular groove 21d whose bottom receives an upper end of the coil spring 22 by which the upper end is pressed against the bottom, and at a generally central part of the bottom surface, there is integrally formed a cylindrical guide portion 21e that guides an upper part of the coil spring 22.

Furthermore, at a position that faces the liquid pressure chamber 20b of the cylinder 20, that is, at the position where the branch passage 13a is placed, there is provided a check valve mechanism 25 that serves as a pressure adjusting valve.

As is seen from FIGS. 2 to 5, the check valve mechanism 25 comprises a cylindrical valve hole 26 that is provided at an upper position of the cylinder 20, a cylindrical metal seat member 27 that is fixed via caulking to a position near a lower open end of the valve hole 26, a filter member 28 that is press-fitted to an upper portion of the seat member 27, a ball valve element 29 that is received in the filter member 28, a valve spring 30 that is installed in the filter member 28 and serves as a second biasing member for biasing the ball valve element 29 toward the seat member 27, a metal-made retainer 31 that is press-fitted to a lower portion of the seat member 27 and formed at a central portion thereof with a sliding hole 31c that will be described hereinafter, and a push rod 32 that is slidably supported in the sliding hole 31c of the retainer 31 to make open/close operation of the ball valve element 29 in response to an upward/downward movement of the piston 21.

The seat member 27 is formed at a generally central portion thereof with a connecting hole 27a through which the other end portion of the branch passage 13a and the liquid pressure chamber 20b are communicated with each other, and the connecting hole 27a is formed at an upper open end thereof with a tapered annular valve seat 27b for putting thereon or releasing therefrom the ball valve element 29. The seat member 27 is integrally formed with an annular fixing flange 27c that is caulked by and fixed to a lower portion of the valve hole 26, and the seat member 27 is integrally formed, at a position below the fixing flange 27c, with a cylindrical retainer fixing portion 27d that is thin in thickness. Within a lower portion of the seat member, there is defined a flat top conical recess 27e.

Figure 7:
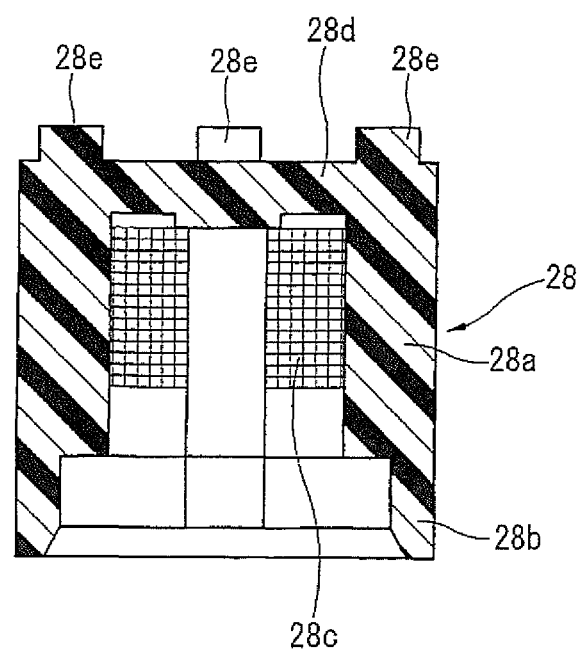
FIG. 7 is a vertically sectioned view of a filter employed in the check valve mechanism.

As is seen from the drawings and also from FIG. 7, the filter member 28 is made of synthetic resin and shaped into a cylindrical member with a lid. A stepped portion 28b formed around a lower part of a cylindrical wall 28a is press fitted to an outer cylindrical wall of a cylindrical upper end 27f in which the connecting hole 27a of the seat member 27 is formed. Furthermore, the filter member 28 is integrally formed, at four areas of the cylindrical wall 28a thereof, with mesh portions 28c. Due to the mesh portions 28c, the brake liquid led from each branch passage 13a to the corresponding liquid pressure chamber 20b is filtered.

To an upper surface of an upper wall 28d of the filter member 28, there are integrally provided four rectangular-parallelopiped projections 28e. The projections 28e are placed at radially outer zones of the upper wall 28d, so that when the filter member 28 is accidentally detached from the cylindrical upper end 27f of the seat member 27, the upper surface of the upper wall 28d and the upper wall surface of the valve hole 26 function to form therebetween spaces that constitute a passage.

The ball valve element 29 is made of metal and biased by the valve spring 30 in a direction to be seated on the valve seat 27b of the seat member 27, that is, in a direction to close the connecting hole 27a, and when the ball valve element 29 is released from the valve seat 27b in response to an excessive upward movement of the piston 21 causing the push rod 32 to push up the ball valve element against the spring force of the valve spring 30, the one end opening of the connecting hole 27a is opened.

Figure 5:
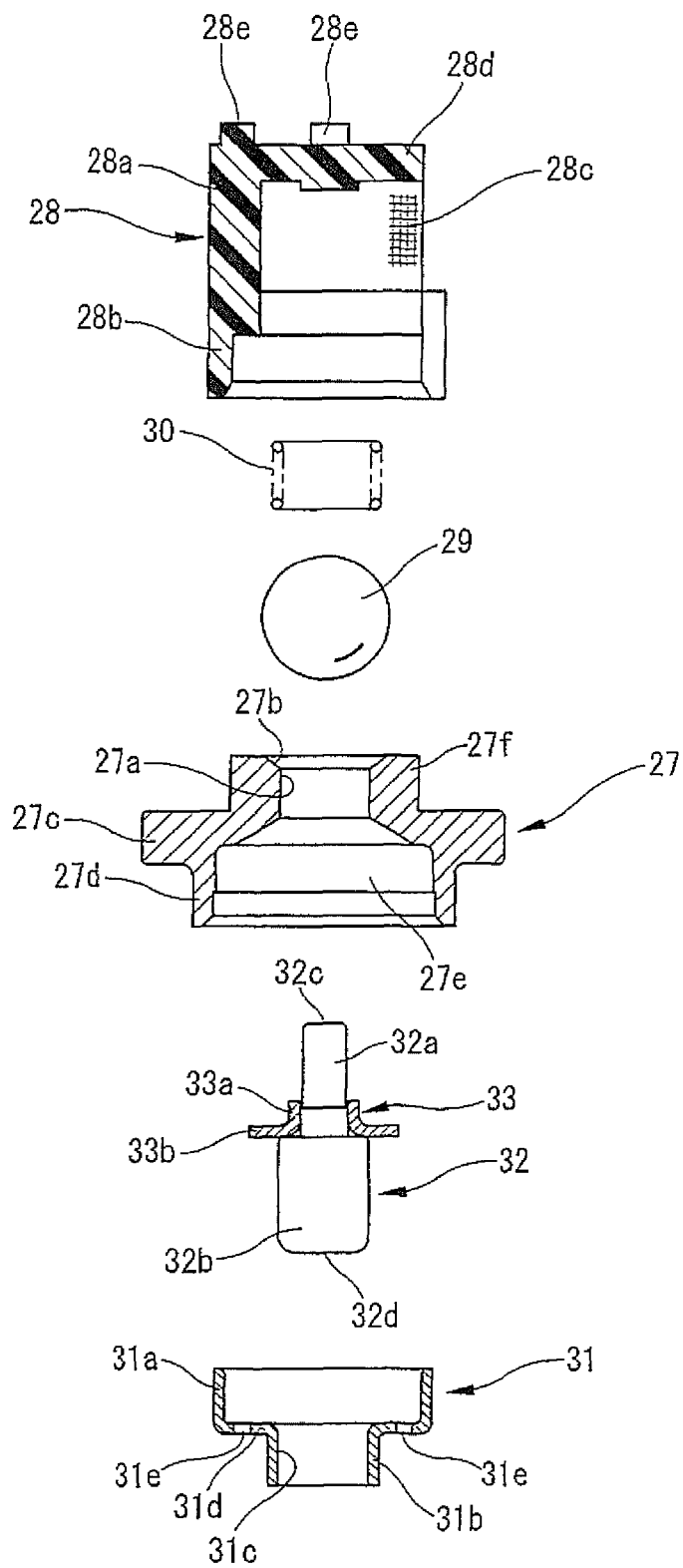
FIG. 5 is an exploded view of the check valve mechanism used in the embodiment.
Figure 6:
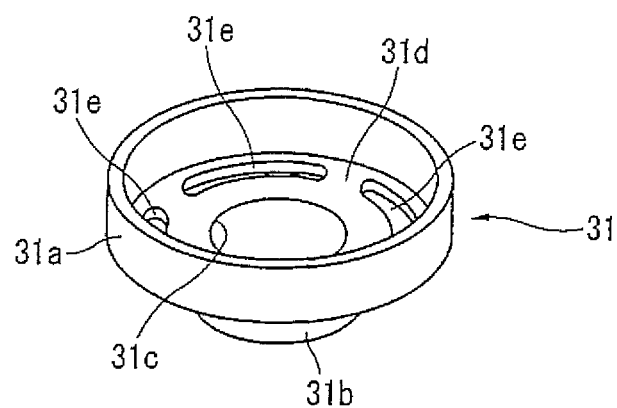
FIG. 6 is a perspective view of a retainer employed in the check valve mechanism.

As is seen from the drawings and also from FIGS. 5 and 6, the retainer 31 comprises a larger diameter cylindrical portion 31a that is shaped into a stepped cylinder and press-fitted into an inside of the retainer fixing portion 27d of the seat member 27, and a smaller diameter cylindrical portion 31b that is integrally formed at a lower center part of the larger diameter cylindrical portion 31a and arranged to face the liquid pressure chamber 20b of the cylinder 21. The smaller diameter cylindrical portion 31b is formed with the above-mentioned sliding hole 31c through which a larger diameter rod part 32b of the push rod 32 slides.

A stepped part between the larger diameter cylindrical portion 31a and the smaller diameter cylindrical portion 31b is formed with a flat annular portion 31d, and this flat annular portion 31d is formed with four connecting openings 31e through which the conical recess 27e of the seat member 27 and the liquid pressure chamber 20d are connected or communicated.

These connecting openings 31e are each shaped into an elongate hole extending in a circumferential direction and these connecting openings are arranged at equally spaced intervals in the circumferential direction.

Figure 4:
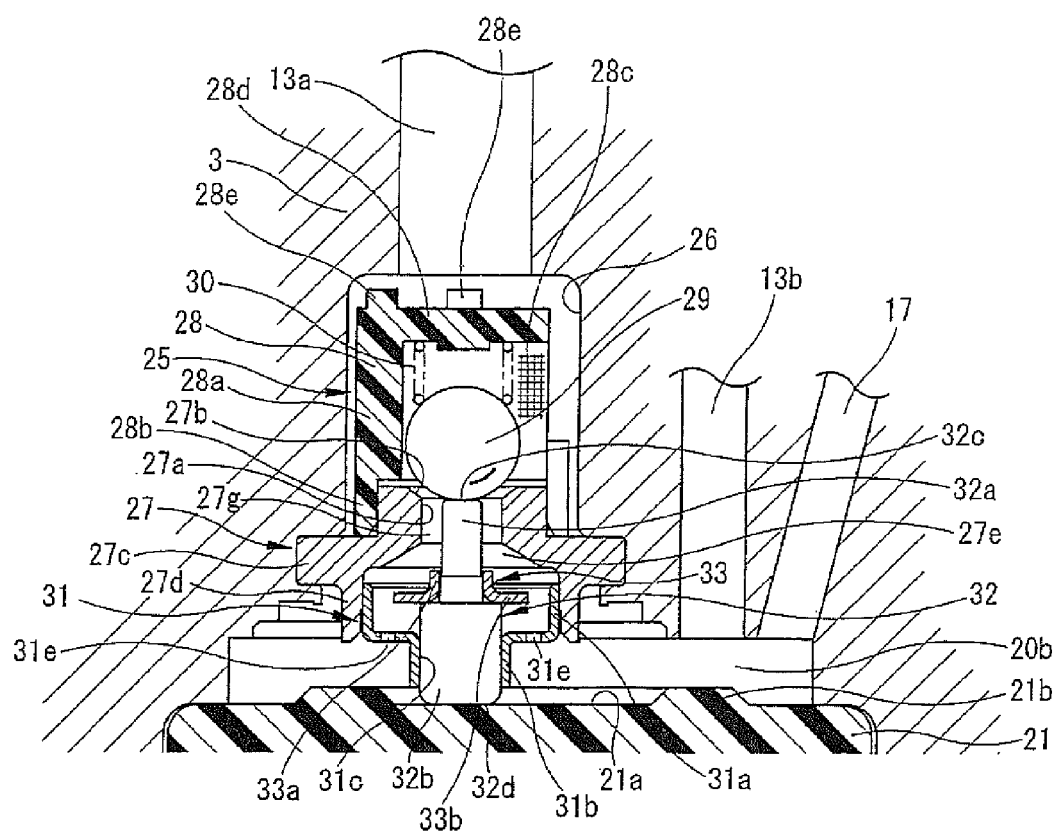
FIG. 4 is an enlarged sectional view of an essential part of the check valve mechanism used in the embodiment.

As is seen from FIGS. 4 and 5, the push rod 32 is made of metal and shaped into a stepped rod and comprises a smaller diameter rod part 32a or a first portion of one side of the push rod that has a flat upper end surface (top surface) 32c that contacts to and releases from the ball valve element 29 through the connecting hole 27a of the seat member 27, and a larger diameter rod part 32b that is integrally formed on a lower end (the other end side) of the smaller diameter rod part 32a and serves as a second portion that contacts to and releases from an upper surface 21a4 of the piston 21.

The smaller diameter rod part 32a has an outer diameter sufficiently smaller than an inner diameter of the connecting hole 27a of the seat member 27 and is constantly placed in the connecting hole 27a, so that a cylindrical passage 27g is formed between the cylindrical outer surface of the rod part 32a and the cylindrical inner surface of the connecting hole 27a.

The larger diameter rod part 32b is formed to have an axial length generally the same as that of the smaller diameter rod part 32a, and the outer diameter of the larger diameter rod part 32b is sufficiently larger than that of the smaller diameter rod part 32a, and thus, an area of a lower end surface 32d of the rod part 32b is sufficiently larger than that of the upper end surface 32c of the smaller diameter rod part 32a. The larger diameter rod part 32b is slidably guided and supported by the sliding hole 31c of the retainer 31.

To a stepped part formed between the smaller diameter rod part 32a and the larger diameter rod part 32b, there is press-fitted a stopper member 33 by which the maximum movement of the push rod 32 toward the piston 21 is limited.

The stopper member 33 is a monoblock member made of metal or synthetic resin and comprises a tubular center part 33a and a flange-like stopper piece 33b that extends radially outward from a lower end of the tubular center part 33a. An inner diameter of the tubular center part 33a is slightly smaller than an inner diameter of the stepped portion of the push rod 32 and the tubular center part 33a is press-fitted to the stepped portion of the smaller diameter rod part 32a. An outer diameter of the stopper piece 33b is slightly larger than the outer diameter of the smaller diameter tubular portion 31b of the above-mentioned retainer 31, so that when the piston 21 is moved down by a predetermined distance or more due to feeding of a larger amount of brake liquid into the liquid pressure chamber 20b of the cylinder 20, the stopper piece 33b is brought into contact with the upper surface of the annular portion 31d thereby to limit the maximum lower position of the push rod 32, that is, downward dislocation of the push rod can be suppressed.

[Operation of the First Embodiment]

First, steps for assembling parts of the check valve mechanism 25 will be described with reference to the exploded view of FIG. 5. The filter member 28 having the valve spring 30 and the ball valve element 29 received therein is press-fitted to the tubular upper end 27f of the seat member 27 through the cylindrical stepped portion 28b. Under this condition, the ball valve element 29 is kept seated on the valve seat 27b of the seat member 27 due to the spring force of the valve spring 30.

While, assembling of the push rod 32 is made from an upper position of the retainer 31. That is, the tubular center part 33a of the stopper member 33 is press-fitted to the smaller diameter rod part 32a of the push rod 32 in advance, and while keeping this state, the larger diameter rod part 32b of the push rod 32 is inserted into the sliding hole 31c of the smaller diameter cylindrical portion 31b of the retainer 31 from the upper side and this process is continued until the time when the stopper piece 33b is brought into contact with the upper end surface of the annular portion 31d of the retainer 31. With this work, assembling position of the push rod 32 can be kept.

Then, the retainer 31 having the push rod 32 mounted thereto is pressed into the seat member 27 from the lower side. That is, while holding the retainer 31 with one hand, the smaller diameter rod part 32a of the push rod 32 is inserted into the connecting hole 27a through the conical recess 27e of the seat member 27 causing the outer cylindrical wall of the larger diameter cylindrical portion 31a of the retainer 31 to be press-fitted to the inner cylindrical wall of the retainer fixing portion 27d.

Then, the unit of the check valve mechanism 25 is positioned in an inside of the cylindrical valve hole 26 and then the cylindrical wall at the lower open end of the valve hole 26 is caulked through the fixing flange 27c of the seat member 27. With this process, assembly of the unit of the check valve mechanism 25 to the housing 3 is completed.

Thereafter, the piston 21 is inserted into the cylinder 20 and then, the flange portion 23a of the lid member 23 is positioned and held at the lower open end of the cylinder 20 while positioning the coil spring 22 at a lower position of the piston 21 through the lid member 23. Then, a cylindrical wall of the lower open end of the cylinder 20 is caulked resulting in that the flange portion 23a of the lid member 23 is fixed and thus assembly of the parts of the reservoir tank 10 is completed.

Under this condition, as is seen from FIGS. 2 and 4, the piston 21 is forced to take its upper position due to the spring force of the coil spring 22 causing the upper peripheral portion of the piston 21 to abut against an upper end peripheral wall of the cylinder 20, so that further upward movement of the piston 21 is suppressed. At the same time, the upper end surface 21a of the piston 21 moves the push rod 32 upward while contacting with the lower end surface 32d of the larger diameter rod part 32b of the push rod 32, and thus, the ball valve element 29 is released from the valve seat 27b to open the upper end opening of the connecting hole 27a.

During running of the vehicle and/or due to braking action, the brake liquid is led into the liquid pressure chamber 20b of the cylinder 20 through the pressure releasing valves 7 or the brake liquid is led from the liquid pressure chamber 29b toward the master cylinder 1 due to operation of the plunger pump 9, so that the piston 21 is moved upward and downward in the cylinder 20 causing the lower end surface 32d of the larger diameter rod part 32b to contact with and release from the upper surface 21a of the piston 21.

That is, as is seen from FIG. 3, when the brake liquid pressure in the liquid pressure chamber 20b is increased, the piston 21 is moved downward by a predetermined distance or more against the spring force of the coil spring 22 and thus, with the aid of the spring force of the valve spring 30, also the push rod 32 is moved downward in the sliding hole 31c through the ball valve element 29. With such action, the ball valve element 29 is seated on the valve seat 27b to close the upper end opening of the connecting hole 27a, and thus, the flow of the brake liquid of the master cylinder 1 from the branch passage 13a to the interior of the liquid pressure chamber 20b is prevented.

While, when, due to reduction of the brake liquid in the liquid pressure chamber 20b, the piston 21 is moved upward due to the spring force of the coil spring 22, the piston upper surface 21a pushes up the push rod 32 thereby to move the ball valve element 29 upward against the spring force of the valve spring 30. With this movement, the ball valve element 29 is released from the valve seat 27b to open the upper end opening of the connecting hole 27a, and thus, the brake liquid in the liquid pressure chamber 20b is fed to the master cylinder 1 through the branch passage 13a.

In this embodiment, the relatively large lower surface 32d of the larger diameter rod part 32b of the push rod 32 abuts against the upper surface 21a of the piston 21, and thus, the surface pressure applied to the piston upper surface 21a is sufficiently small. Thus, even if the entire portion of the piston 21 is made of synthetic resin, production of the undesired recess on the upper surface 21a can be suppressed with an economical merit. Accordingly, the technology employed in the prior art in which the entire portion of the piston 21 is made of metal and the upper surface of the piston 21 is lined with a metal plate via insert molding is no longer needed, and thus, light-weighting of the piston 21 and suppression of increasing of production cost can be obtained.

In other words, in this embodiment, with improvement of the construction of the check valve mechanism 25, the assembly process can be so made that after the larger diameter rod part 32b of the push rod 32 is inserted into the sliding hole 31c of the smaller diameter cylindrical portion 31b of the retainer 31 from above bringing the stopper piece 33b into contact with the upper surface of the flat annular portion 31d of the retainer 31 to hold the assembling position of the push rod 32, the retainer 31 is pressed into the seat member 27 from below for achieving insertion of the push rod 32 into the seat member 27, and thus, the outer diameter of the larger diameter rod part 32b of the push rod 32 that contacts the upper surface 21a of the piston 21 can be increased. Thus, the surface pressure produced when the push rod 32 is pressed against the piston upper surface 21b can be reduced. Accordingly, production of the undesired recess on the piston upper surface 21a is suppressed and thus the durability of the piston is increased.

Furthermore, in this embodiment, only the retainer 31 is additionally used, and thus, simplification of the construction is obtained and complexity in production and assembling work is suppressed. In this respect, rise of cost can be suppressed.

Furthermore, as is mentioned hereinabove, in this embodiment, since, in addition to the size-enlargement of the larger diameter rod part 32b, the upper surface 31a of the piston 21 against which the push rod 32 abuts is made of synthetic resin, vibration hitting noises that would be produced when the push rod 32 abuts against the piston upper surface 31a can be suppressed. As a result, vehicle passengers are prevented from having uncomfortable feeling. As is mentioned hereinabove, in view of the low cost, light weighting and suppression of the vibration hitting noises, the best material for the piston 21 is synthetic resin. However, the piston 21 may be made of metal. Also in this case, due to the concept of the present embodiment, the surface pressure produced between the piston 21 and the push rod 32 can be restrained.

Second Embodiment

Figure 8:
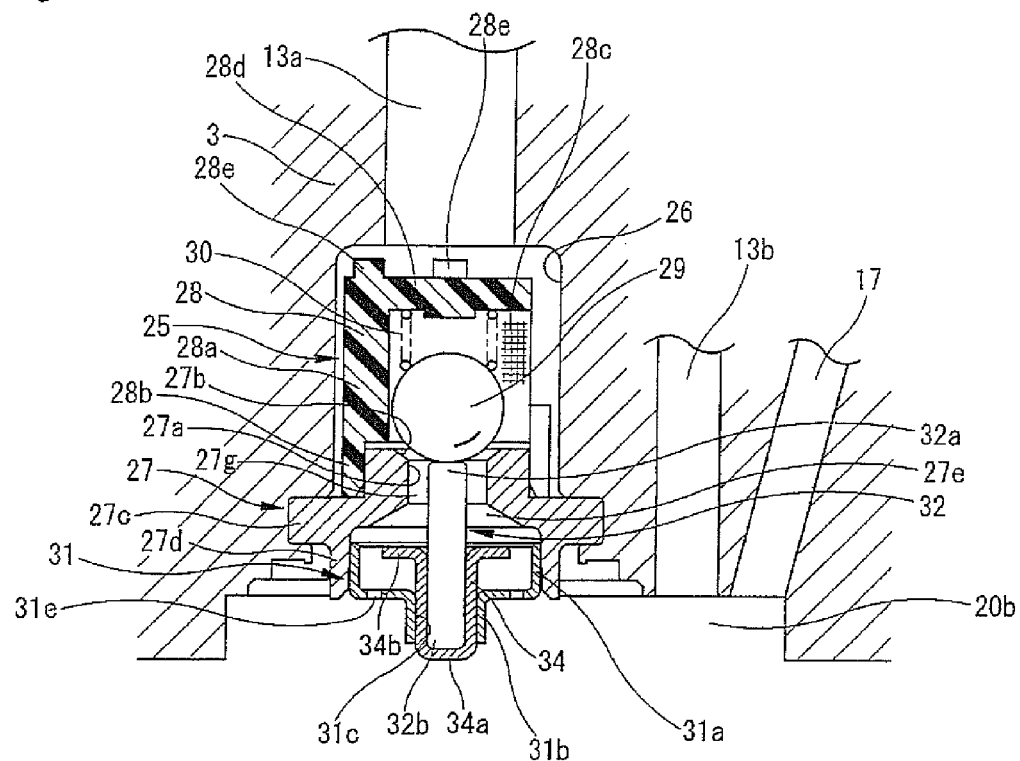
FIG. 8 is a sectional view of an essential part of a check valve mechanism that is used in a second embodiment of the present invention.

FIG. 8 shows a second embodiment of the present invention that has the push rod 32 changed in structure. More specifically, the push rod 32 is so made that the outer diameter of the entire construction of the push rod 32 is the same as that of the above-mentioned smaller diameter rod part 32a, and onto an outer cylindrical surface of a lower end rod part 32e, there is press-fitted an inserting member 34, whose vertical section is shaped generally U, from below. The outer diameter of the inserting member 34 is generally the same as that of the larger diameter rod part 32b of the first embodiment, and thus, the area of the lower end surface 34a of the inserting member is generally the same as that of the lower end surface 32d of the larger diameter rod part 32b. The inserting member 34 is integrally formed at its upper end with a flange like stopper piece 34b which serves as the above-mentioned stopper member 33.

Since structures other than the above-mentioned changed structure are the same as in the first embodiment, the same effects are obtained. However, since, in this second embodiment, the inserting member 34 has not only a diameter enlarging function for the push rod 32 but also a stopper function for the push rod, the work for producing the entire construction of the push rod 32 is simplified and thus cost reduction is obtained as compared with the work in the first embodiment wherein the stopper member 33 is provided in addition to the stepped push rod 32.

Third Embodiment

Figure 9:
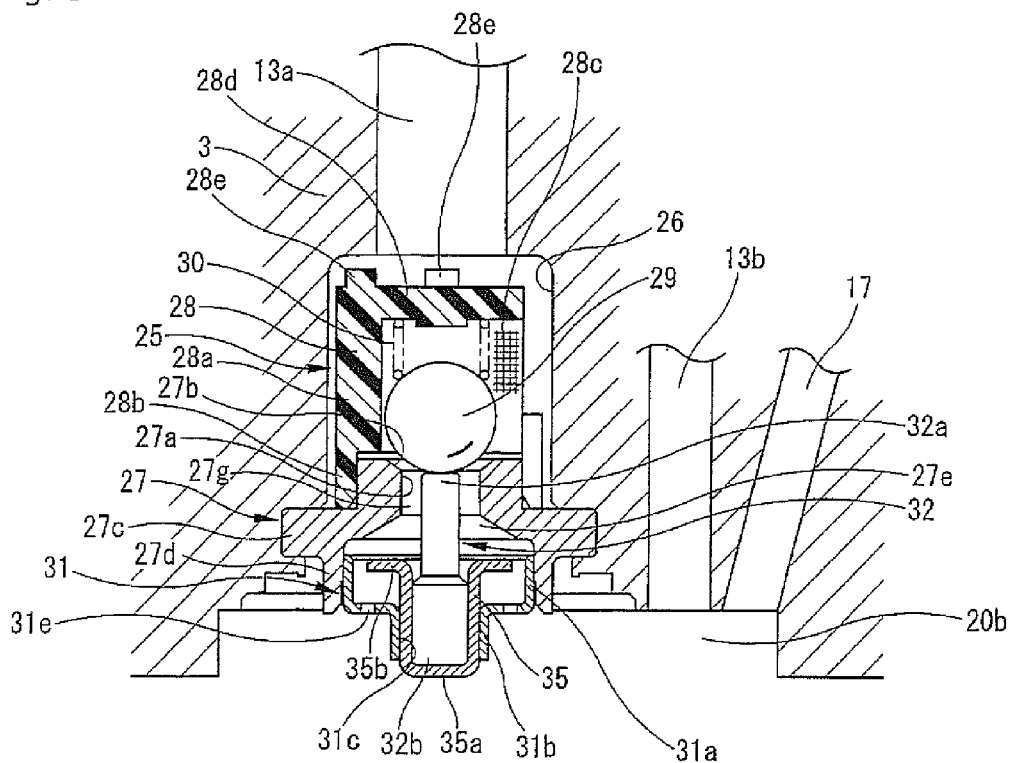
FIG. 9 is a sectional view of an essential part of a check valve mechanism that is used in a third embodiment of the present invention.

FIG. 9 shows a third embodiment of the present invention in which the push rod 32 used therein is the same as that of the first embodiment and onto an outer cylindrical surface of the larger diameter rod part 32b, there is press-fitted an inserting member 35, whose outer diameter is larger than that of the inserting member used in the second embodiment, from below. In this inserting member 35, the area of the lower end surface 35a is further increased, and a flange like stopper piece 35b is integrally connected to the upper end of the inserting member. It is to be noted that in response to enlargement of the inserting member 34, the inner diameter of the smaller diameter cylindrical portion 31b of the retainer 31, that is, the inner diameter of the sliding hole 31c through which the inserting member 34 slides is increased.

Accordingly, in this third embodiment, the contact surface pressure produced upon contact of the inserting member 35 with the piston upper surface 21a is further reduced, and thus, production of the recess on the piston upper surface 21a and generation of the vibration hitting noises are further suppressed.

Fourth Embodiment

Figure 10:
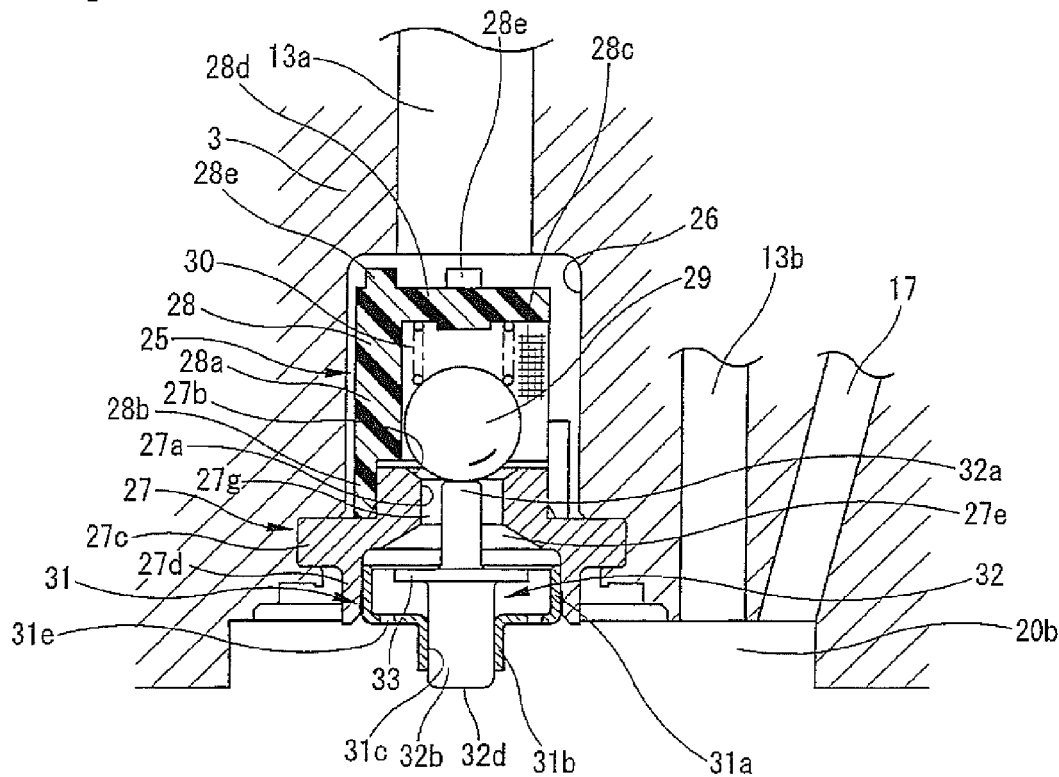
FIG. 10 is a sectional view of an essential part of a check valve mechanism that is used in a fourth embodiment of the present invention.

FIG. 10 shows a fourth embodiment in which the type of the push rod 32 of the first embodiment is used except that the outer diameter of the larger diameter rod part 32b is further increased and a flange like stopper member 33 of synthetic resin is integrally connected to a stepped portion between the larger and smaller diameter rod parts 32b and 32a. In accordance with the enlargement of the larger diameter rod part 32b, the internal diameter of the sliding hole 31c of the retainer 31 is increased.

Accordingly, also in this fourth embodiment, the area of the lower end surface 32d of the larger diameter rod part 32b is further increased due to the diametrical enlargement of the part 32b, and thus, like in the third embodiment, the surface pressure applied to the upper surface 21a of the piston 21 is further reduced, and thus production of the undesired recess on the piston upper surface 21a and vibration hitting noises can be more effectively suppressed.

Furthermore, due to integration of the stopper member 33 with the push rod 32, assembling work can be simplified.

Fifth Embodiment

Figure 11:
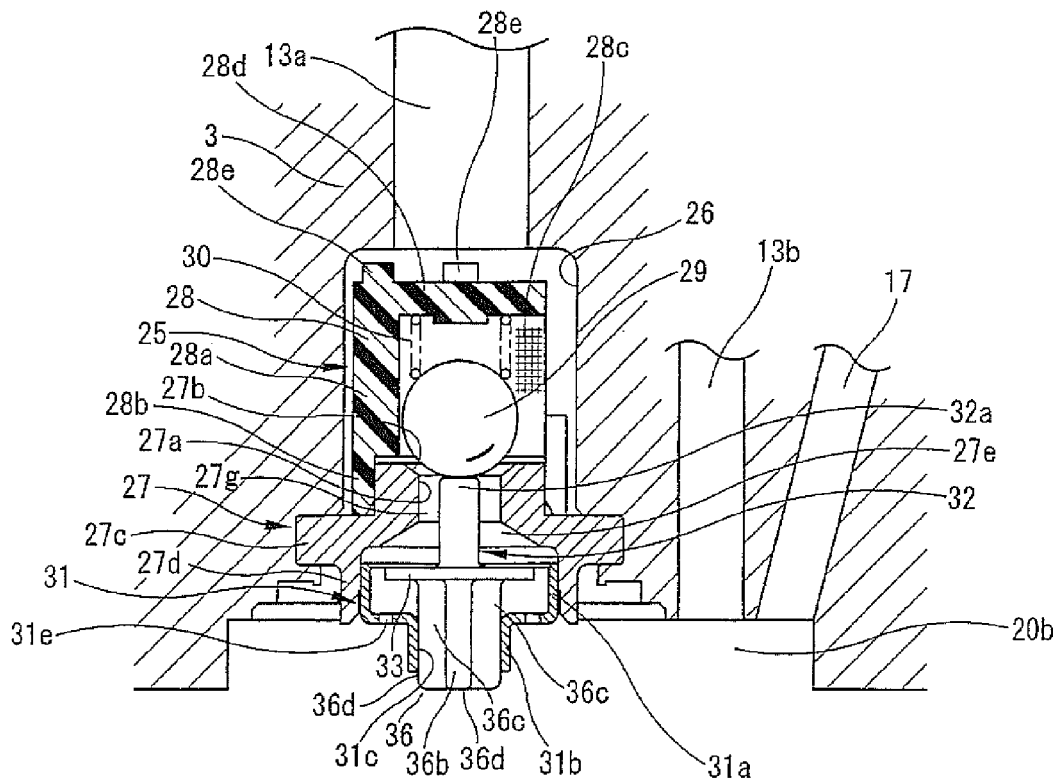
FIG. 11 is a sectional view of an essential part of a check valve mechanism that is used in a fifth embodiment of the present invention.
Figure 12:
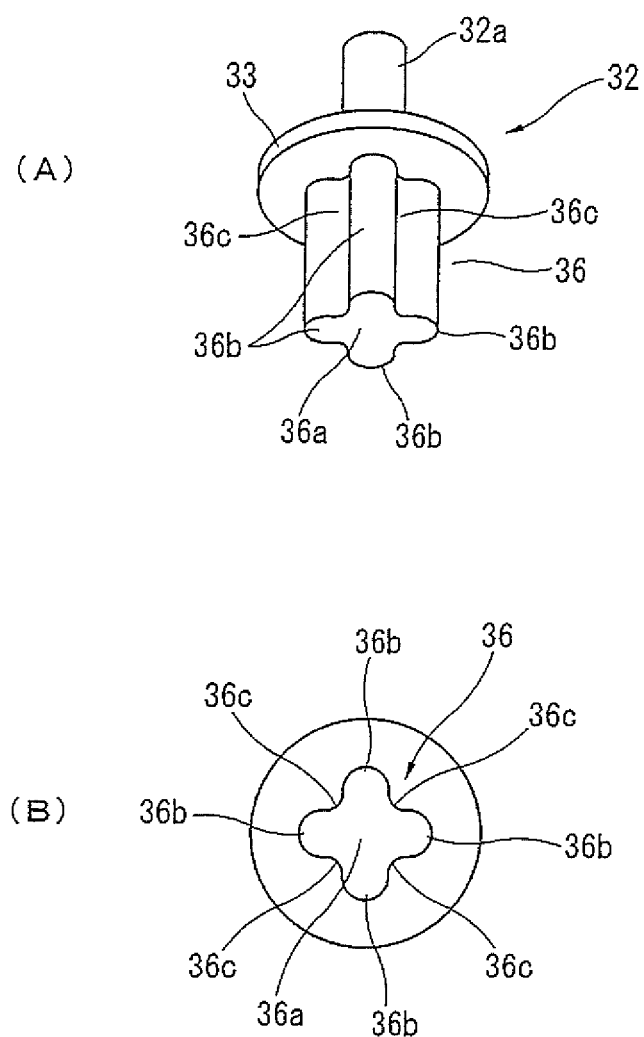
FIG. 12A is a perspective view of a push rod employed in the fifth embodiment and FIG. 12B is a bottom view of the push rod.
Figure 13:
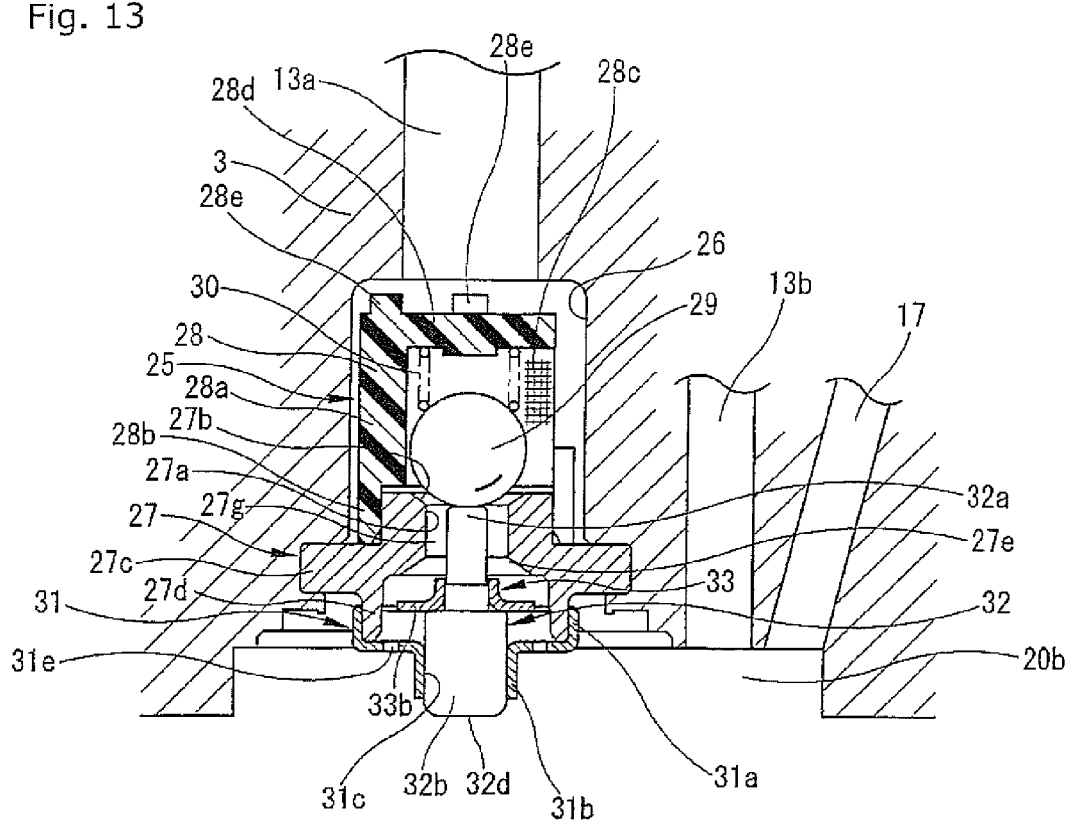
FIG. 13 is a sectional view of an essential part of a check valve mechanism that is used in a sixth embodiment of the present invention.
Figure 14:
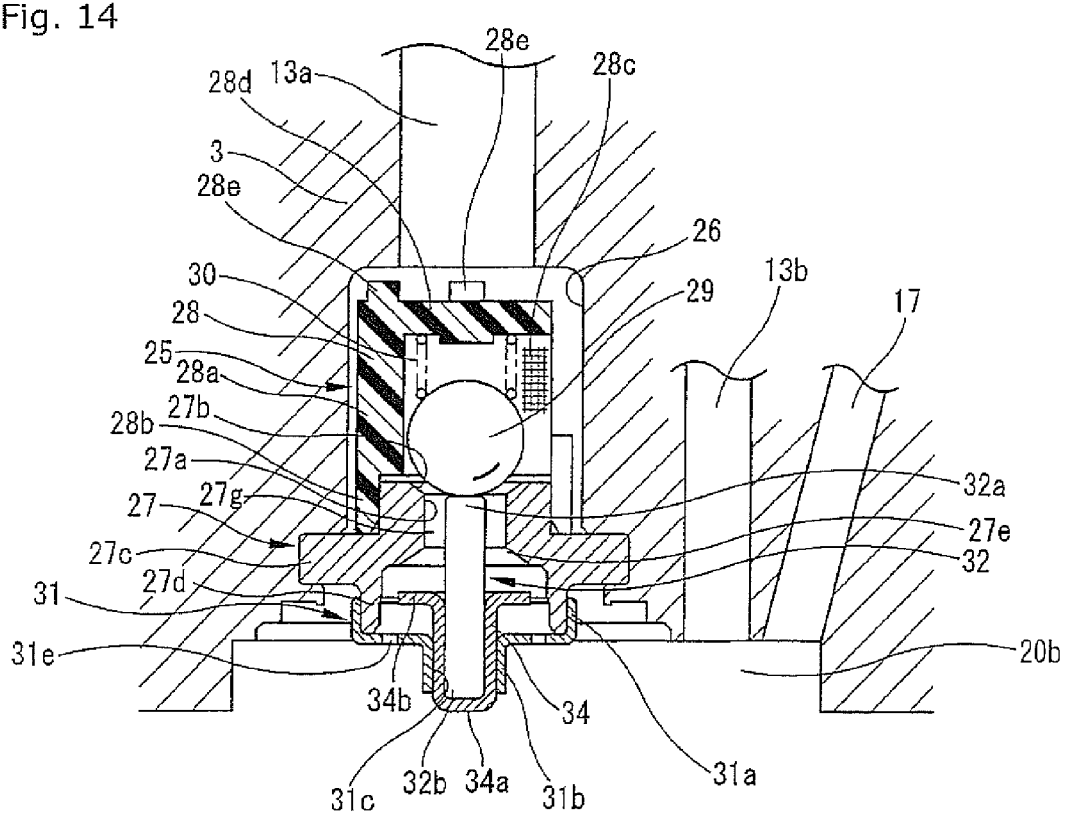
FIG. 14 is a sectional view of an essential part of a check valve mechanism that is used in a seventh embodiment of the present invention.
Figure 15:
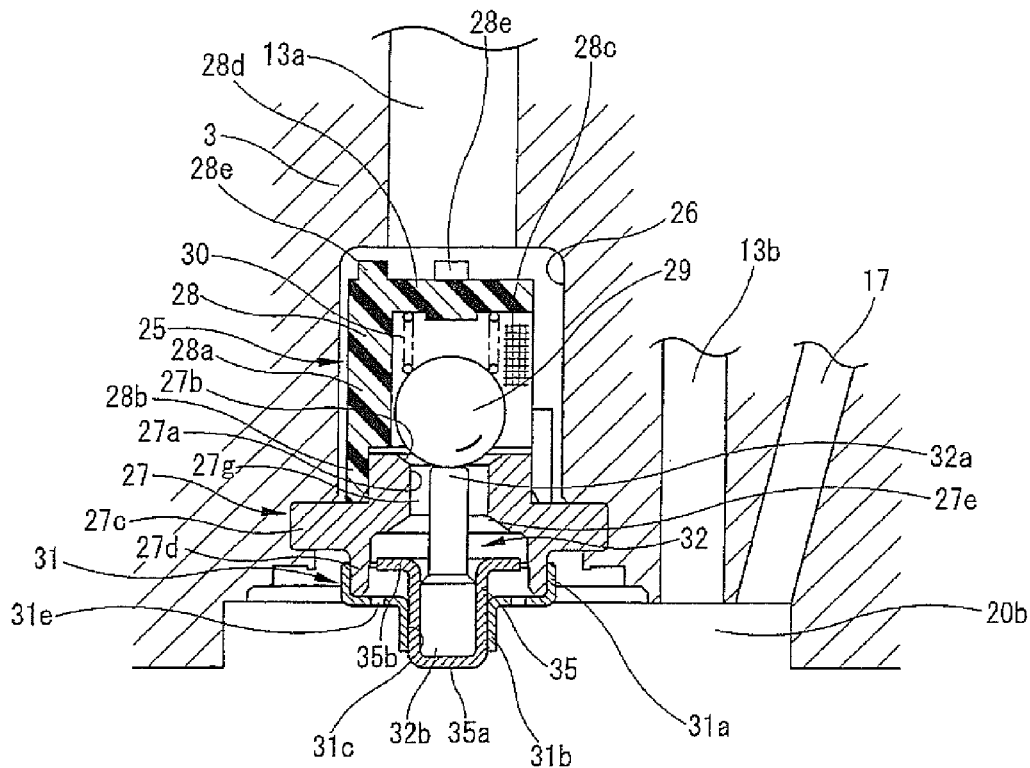
FIG. 15 is a sectional view of an essential part of a check valve mechanism that is used in an eighth embodiment of the present invention.

FIG. 11 shows a fifth embodiment that has the larger diameter rod part of the push rod 32 changed in structure. As is seen from FIGS. 12A and 12B, although the smaller diameter rod part 32a is the same in structure as that of the first embodiment, the larger diameter rod part 36 is so changed as to comprise a central part 36a that is provided on a central axis portion and four parts 36b that are radially outwardly projected from the central axis part 36a in a manner to form a cross in a transverse section. Between mutually adjacent two of the projected parts 36b, there are formed round grooves 36c that serve each as a passage for the brake liquid.

To a stepped part between the smaller diameter rod part 32a and the larger diameter rod part 32b, there is integrally connected a flange like stopper member 33.

Accordingly, in this fifth embodiment, the bottom surface of the larger diameter rod part 36, that is to say, an entire lower end surface including the lower end surface of the central part 36a and that of the four projected parts 36b is able to have a relatively larger value in area, and thus, the surface pressure produced when the entire lower end surface abuts against the the upper surface 21a of the piston 21 can be reduced to a sufficiently low level. Particularly, due to provision of the projected parts 36b, the surface pressure produced upon contact with the piston upper surface 21a is largely dispersed, and thus further reduction of the surface pressure is obtained. As a result, the surface pressure applied to upper surface 21a of the piston 21 is further reduced and thus the undesired recess on the piston upper surface 21a and the undesired vibration hitting noises can be more effectively suppressed.

Furthermore, since, in addition to the connecting openings 31e of the retainer 31, the round grooves 36c can serve as the connecting grooves, the flow of the brake liquid from the liquid pressure chamber 20b to the master cylinder 1 through the conical recess 27e and the branch passage 13b can be made much smoother.

Furthermore, due to the integration of the stopper member 33 with the push rod 32, the assembling work can be smoothly made like in the fourth embodiment.

Furthermore, due to provision of the round grooves 36c to the larger diameter rod part 36, it is possible to remove the connecting openings 31e of the retainer 31.

Sixth to Tenth Embodiments

FIGS. 13 to 17 show sixth to tenth embodiments that basically correspond to the above-mentioned first to fifth embodiments except that in the sixth to tenth embodiments, the outer diameter of the larger diameter cylindrical portion 31a of the retainer 31 is larger than that of the first to fifth embodiments and an inner cylindrical surface of the larger diameter cylindrical portion 31a is press-fitted onto an outer cylindrical surface of the retainer fitting portion 27d of the seat member 27.

Since structures other than the above-mentioned structure are the same as those of the first to fifth embodiments, a similar operation effect is obtained of course, and in particular, since the larger diameter cylindrical portion 31a is press-fitted onto the outer surface of the retainer fitting portion 27d, the work for positioning the retainer 31 relative to the seat member 27 and the work of the press-fitting are simplified.

Eleventh Embodiment

Figure 16:
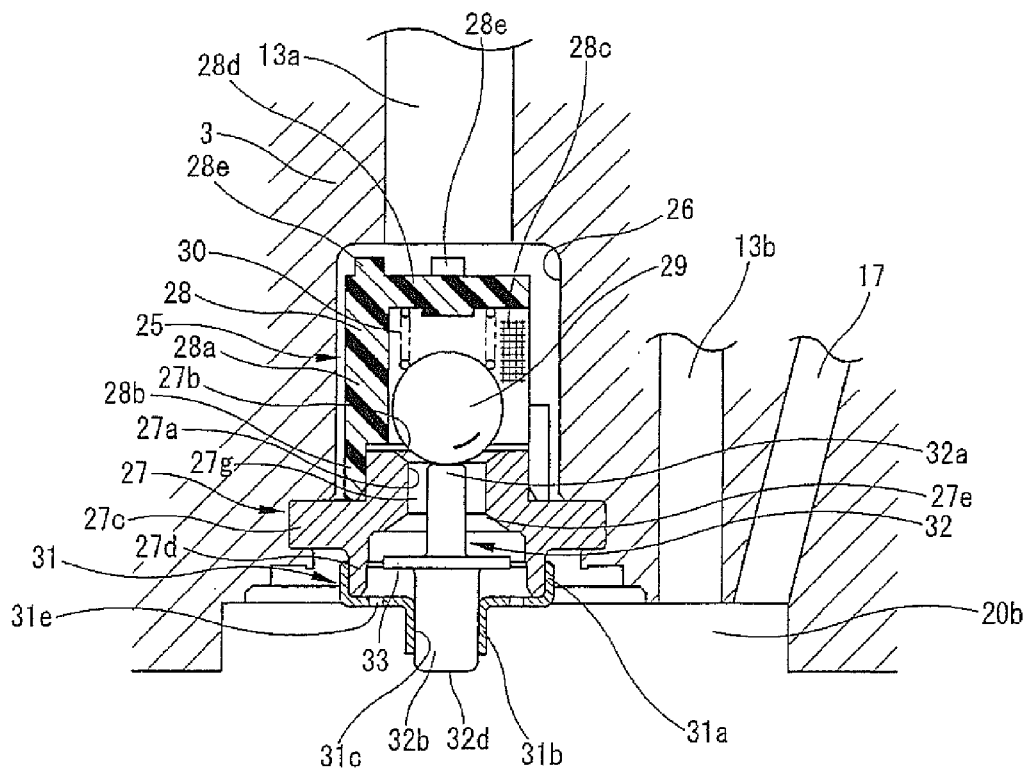
FIG. 16 is a sectional view of an essential part of a check valve mechanism that is used in a ninth embodiment of the present invention.
Figure 17:
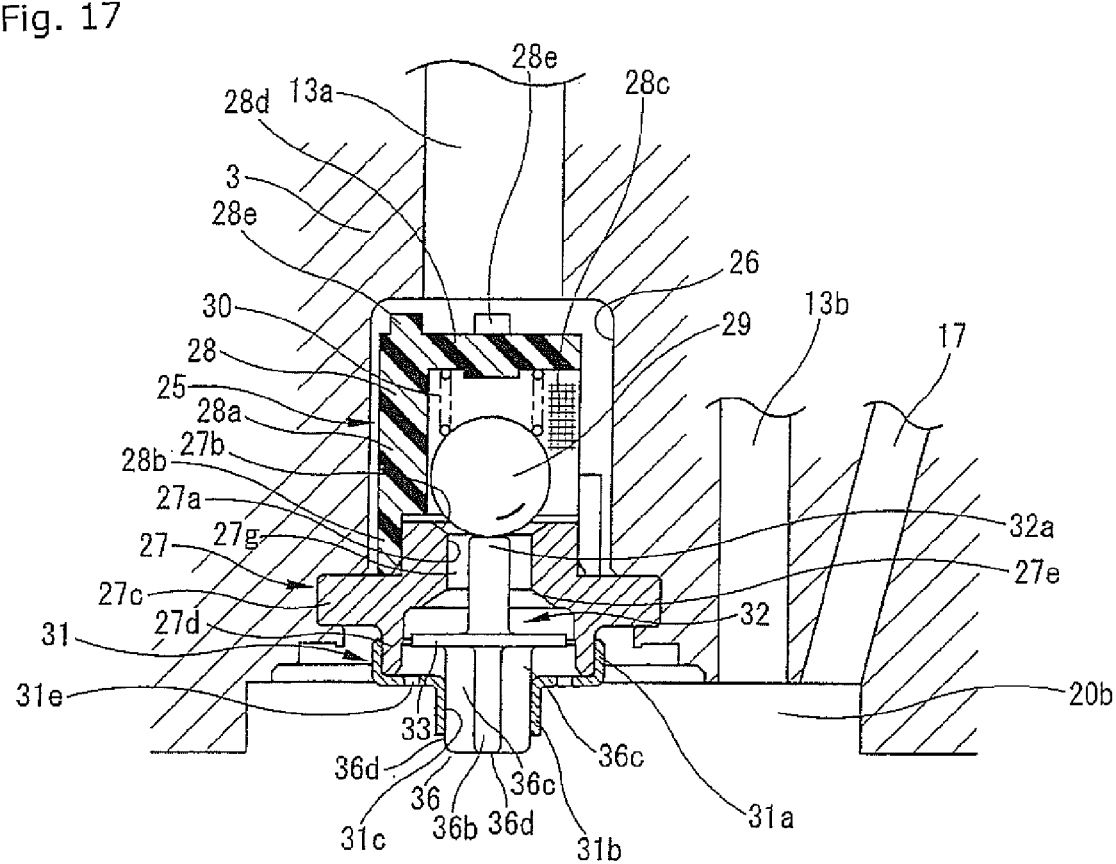
FIG. 17 is a sectional view of an essential part of a check valve mechanism that is used in a tenth embodiment of the present invention.
Figure 18:
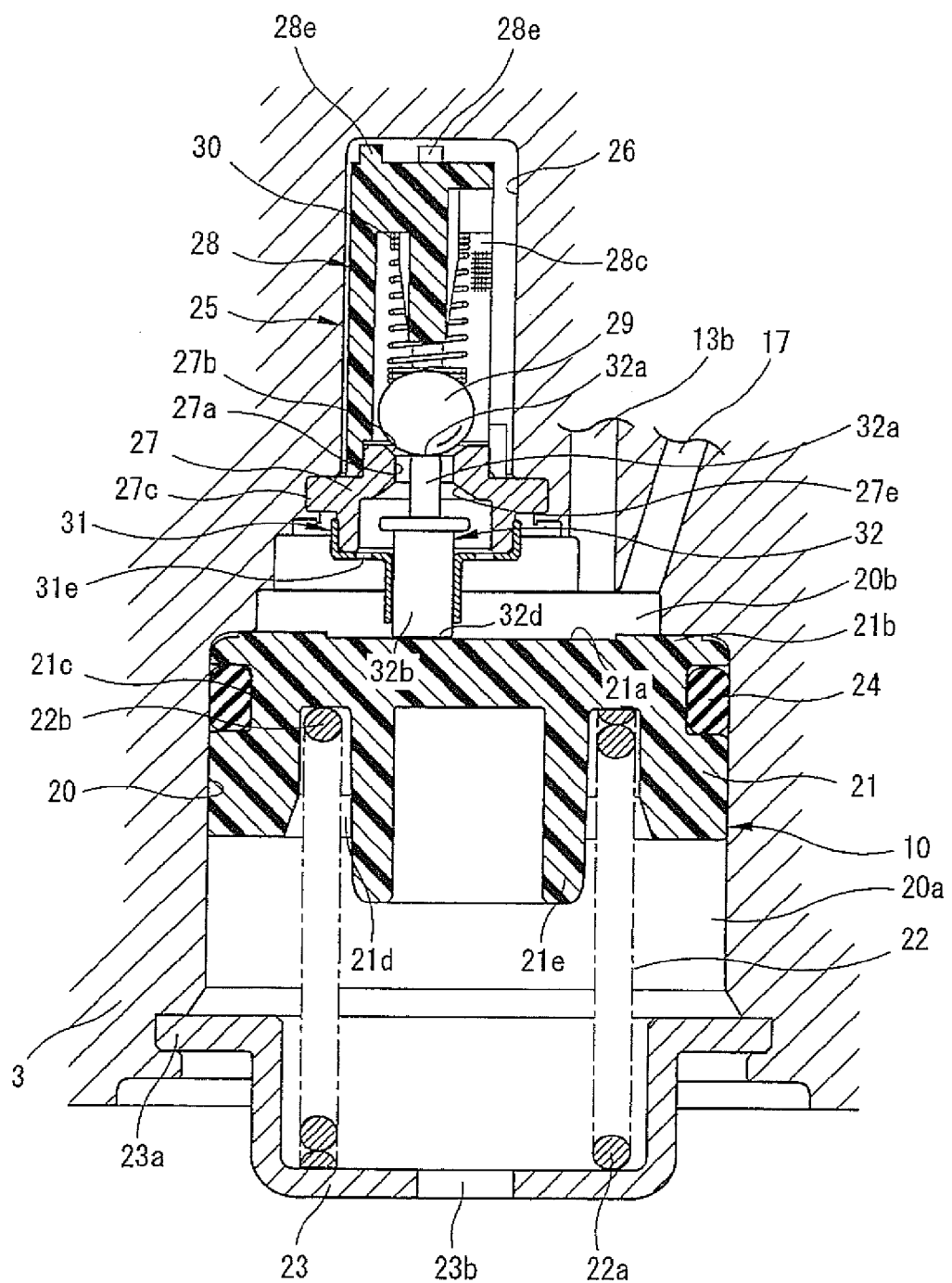
FIG. 18 is a sectional view of an essential part of a check valve mechanism that is used in an eleventh embodiment of the present invention.
Figure 19:
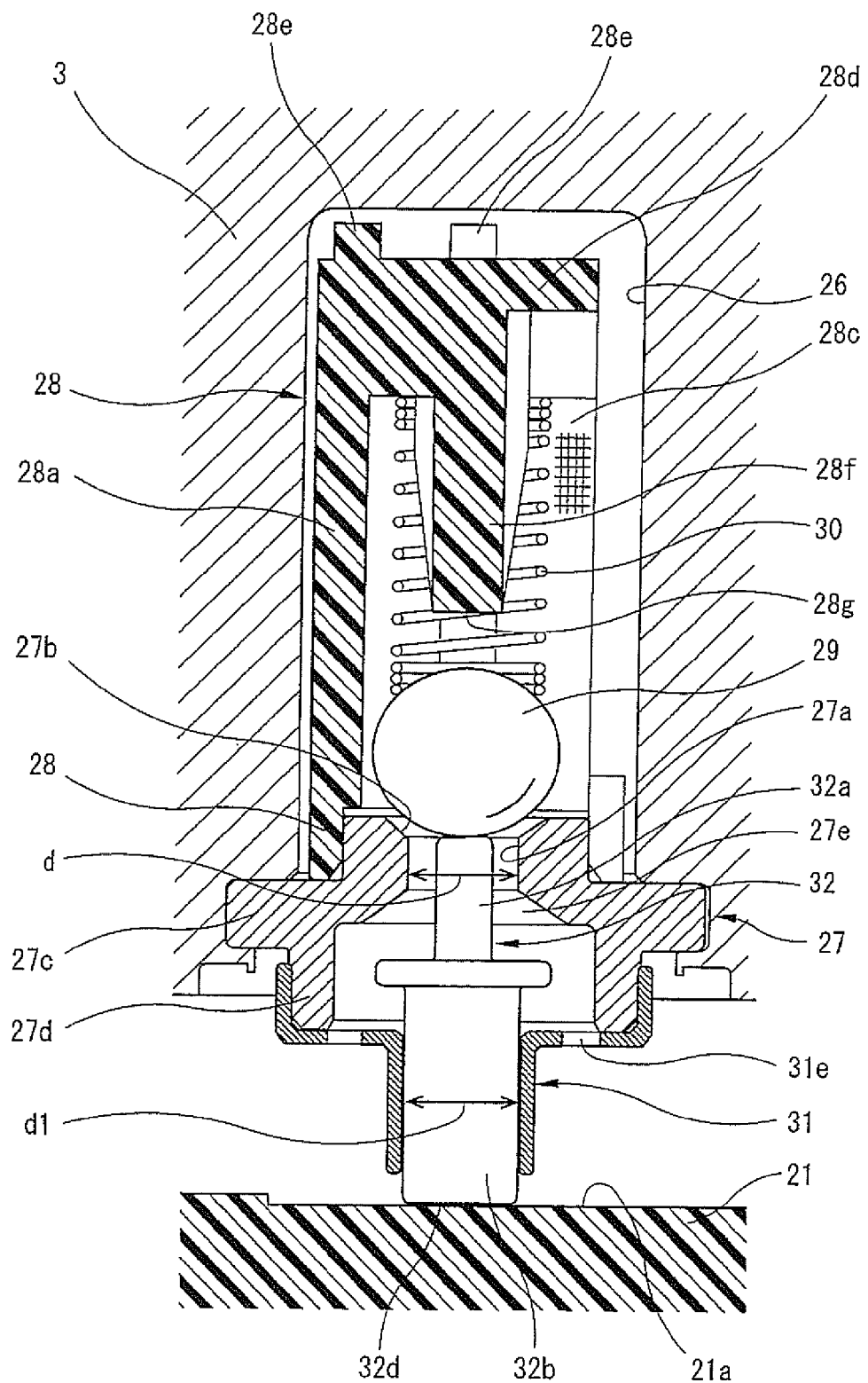
FIG. 19 is an enlarged sectioned view of an essential part of a check valve mechanism that is employed in the embodiment.

FIGS. 18 and 19 show an eleventh embodiment that is similar in construction to the ninth embodiment of FIG. 16 except that in the eleventh embodiment, the filter member 28 is shaped longer in the axial direction and the inner diameter of the connecting hole 27a of the seat member 27 is made smaller than the outer diameter of the larger diameter rod part 32b of the push rod 32.

That is, in the filter member 28, the cylindrical wall 28a is shaped longer in the axial direction and thus the total area of the mesh portions 28c is enlarged in the axial direction. Furthermore, the upper wall 28d is integrally formed at its lower central area with a regulating shaft portion 28f and due to the axial enlargement of the cylindrical wall 28 in the axial direction, the regulating shaft portion 28f prevents an excessive movement of the ball valve element 29 in the upward direction by its leading end surface 28g.

An inner diameter d of the connecting hole 27a is slightly smaller than an outer diameter dl of the larger diameter rod part 32b.

Accordingly, in case where, for assembling the parts, the larger diameter rod part 32b of the push rod 32 is about to be installed to the side of the connecting hole 27a by mistake, the larger diameter rod part 32b having the larger outer diameter is brought into abutment with a lower open edge of the connecting hole 27a and thus the larger diameter rod part 32b is not allowed to pass through the hole 27a, and thus, erroneous assembly can be suppressed in advance.

Furthermore, due to provision of the regulating shaft portion 28f, excessive upward movement of the ball valve element 29 is suppressed, and for the same reason, a flexible deformation of the valve spring 30 in a lateral direction is restrained, and thus, the behavior or movement of the valve valve element 29 and valve spring 30 can be stabilized.

Since structures other than the above-mentioned structure are the same as those of the above-mentioned embodiments, operation effects similar to those obtained by the above-mentioned embodiments are obtained.

When, in the above-mentioned embodiments, the piston 21 is moved down by a degree equal to or greater than a predetermined degree due to increase of the brake liquid pressure in the liquid pressure chamber 20b, the stopper member 33 or the stopper piece 34b or 35b is brought into contact with the upper surface of the annular portion 31d to regulate the lowest position of the push rod 32. However in the eleventh embodiment, the stopper member 33 or the stopper piece 34b or 35b can be omitted. In such case, the push rod 32 constantly contacts the upper surface 21a of the piston 21, and thus, undesired hitting noises as well as cost increase can be suppressed.

The present invention is not limited to the constructions of the above-mentioned embodiments and various modifications of the embodiments are available within the scope of the present invention.

In the following, technical concepts of the present invention except those defined by Claims will be described.
[Claim a] A brake system as defined in either one of claims 1 to 5, in which an axial length of the recess of the seat member is greater than a stroke amount by which the push rod is moved maximally by the piston.

The invention claimed is:

1. A brake system comprising:
a reservoir tank including a bottomed cylinder formed in a housing and able to reserve therein a brake liquid through an oil passage formed in the housing, a piston slidably disposed in the cylinder to partition an interior of the cylinder into an air chamber and a liquid pressure chamber in which the brake liquid is received, and a first biasing member for biasing the piston in a direction to reduce the volume of the liquid pressure chamber, further comprising:
a seat member having a connecting hole through which the oil passage and the liquid pressure chamber are connected, the connecting hole having at one open end thereof a valve seat;
a valve body element selectively seated on and separated from the valve seat to close and open the connecting hole, and a second biasing member for biasing the valve body element toward the valve seat; and
a push rod that, when pushed toward the seat member by the piston, releases the valve body element from the valve seat through the connecting hole against a biasing force of the second biasing member thereby to open the open end of the connecting hole,
wherein the push rod has one end portion contactable with the valve body element and the other end portion contactable with an upper surface of the piston, and an area of the other end portion is equal to or larger than that of the one end portion;
wherein the seat member is formed at a position opposite to the one open end with a recess opened to the liquid pressure chamber, a retainer that has at a central portion thereof a sliding hole for slidably supporting the other end portion of the push rod is fixed to an open end side of the recess, and at least one of the push rod or the retainer is formed with a connecting passage through which the recess and the liquid pressure chamber are communicated;
wherein a leading end face of the other end portion of the push rod is larger in area than a leading end face of the one end portion;
wherein an outer cylindrical wall of the push rod is provided with a stopper portion by which a maximum movement of the push rod toward the piston is restrained, and when the piston is moved down by a degree equal to or greater than a predetermined degree, the stopper portion is brought into abutment with a hole edge of the sliding hole placed at a recess side of the retainer, thereby suppressing the push rod from making a further downward movement, and
wherein the retainer is a separate component from the seat member.

2. A brake system as claimed in claim 1, in which:
an outer diameter of the other end portion of the push rod is larger than an inner diameter of the connecting hole, an outer diameter of the one end portion of the push rod is smaller than the inner diameter of the connecting hole, and the one end portion of the push rod is placed in the connecting hole.

3. A brake system as claimed in claim 1, in which:
at least one or both of the piston and the push rod are made of synthetic resin.

4. A brake system as claimed in claim 1, in which:
the connecting hole is so shaped as to allow insertion of the one end portion of the push rod thereinto, and the one end portion is arranged in the connecting hole.

5. A brake system comprising:
a reservoir tank including a bottomed cylinder formed in a housing and able to reserve therein a brake liquid through an oil passage formed in the housing, a piston slidably disposed in the cylinder to partition an interior of the cylinder into an air chamber and a liquid pressure chamber in which the brake liquid is received, and a first biasing member for biasing the piston in a direction to reduce the volume of the liquid pressure chamber, further comprising:
a seat member that is formed with a connecting hole for communicating the oil passage with the liquid pressure chamber and formed at one open end thereof with a valve seat, a valve body element that is selectively seated on and released from the valve seat to selectively close and open the connecting hole, a second biasing member for biasing the valve body element toward the valve seat, and a pressure adjusting valve that includes a push rod that has a first portion provided at a side of the valve body element and a second portion provided at a side of the piston and having an outer diameter larger than that of the first portion,
wherein, upon contacting with the piston, the second portion is pushed up by the piston, and the push rod releases the valve body element from the valve seat against a spring force of the second biasing member to thereby open one end opening of the connecting hole;
wherein the push rod is formed therearound with a projected piece whose outer diameter is larger than that of the second portion;
wherein the seat member is formed, at a side opposite to the one open end, with a recessed portion that is opened to the liquid pressure chamber;
wherein the pressure adjusting valve is equipped with a retainer that is provided at an open end side of the recessed portion and has a sliding hole by which the second portion is slidably supported;
wherein when the piston is moved down by a degree equal to or greater than a predetermined degree, the projected piece is brought into abutment with an open edge of the sliding hole at the open end side of the recessed portion, and
wherein the retainer is a separate component from the seat member.

6. A brake system as claimed in claim 5, in which:
an outer diameter of the second portion of the push rod is larger than an inner diameter of the connecting hole, and the first portion is arranged in the connecting hole.

7. A brake system as claimed in claim 5, in which:
the connecting hole is so sized in inner diameter as to allow insertion of the first portion of the push rod and to block insertion of the second portion of the push rod, and the first portion is arranged in the connecting hole.

8. A brake system as claimed in claim 5, in which:
an area of the leading end face of the second portion is larger than that of the leading end face of the first portion.

9. A brake system as claimed in claim 5, in which:
the push rod is constructed of synthetic resin.

10. A brake system as claimed in claim 5, in which:
the piston is constructed of synthetic resin.

11. A brake system as claimed in claim 5, in which:
at least one of the push rod or the retainer of the pressure adjusting valve is formed with a passage portion through which the recessed portion and the liquid pressure chamber are communicated.

12. A brake system as claimed in claim 11, in which:
the passage portion is formed in the retainer; and
the retainer is provided with a circular plate portion that is formed with the passage portion and a cylindrical portion that is connected to the open end side of the recessed portion of the seat member and raised from a periphery of the circular plate, the cylindrical portion being fixed by being pressed into the open end side of the recessed portion.

13. A brake system comprising:
a reservoir tank including a bottomed cylinder formed in a housing and able to reserve therein a brake liquid through an oil passage formed in the housing, a piston slidably disposed in the cylinder to partition an interior of the cylinder into an air chamber and a liquid pressure chamber in which the brake liquid is reserved, and a first biasing member by which the piston is biased in a direction to reduce the volume of the liquid pressure chamber, further comprising:

a seat member that has a connecting hole through which the oil passage and the liquid pressure chamber are communicated and is formed, at one open edge of the connecting hole, with a valve seat;

a valve body element that is selectively seated on and released from the valve seat thereby to close and open the connecting hole, and a second biasing member that biases the valve body element toward the valve seat; and a push rod that, when pushed toward the seat member by the piston, releases the valve body element from the valve seat through the connecting hole against the biasing force of the second biasing member thereby to open the one open edge of the connecting hole, wherein the push rod has one end portion contactable with the valve body element and the other end portion contactable with an upper surface of the piston, an outer diameter of the other end portion is larger than an inner diameter of the connecting hole, and the one end portion is placed in the connecting hole;

wherein the seat member is formed at a position opposite to the one open edge with a recess opened to the liquid pressure chamber, a retainer that has at a central portion thereof a sliding hole for slidably supporting the other end portion of the push rod is fixed to an open end side of the recess, and at least one of the push rod or the retainer is formed with a connecting passage through which the recess and the liquid pressure chamber are communicated;

wherein a leading end face of the other end portion of the push rod is larger in area than a leading end face of the one end portion;

wherein an outer cylindrical wall of the push rod is provided with a stopper portion by which a maximum movement of the push rod toward the piston is restrained, and when the piston is moved down by a degree equal to or greater than a predetermined degree, the stopper portion is brought into abutment with a hole edge of the sliding hole placed at a recess side of the retainer, thereby suppressing the push rod from making a further downward movement, and wherein the retainer is a separate component from the seat member.

14. A brake system as claimed in claim 13, in which:
at least one or both of the piston and the push rod are constructed of synthetic resin.

\* \* \* \* \*